US011352960B2

(12) United States Patent
Mancini et al.

(10) Patent No.: US 11,352,960 B2
(45) Date of Patent: Jun. 7, 2022

(54) FUEL OXYGEN REDUCTION UNIT

(71) Applicant: General Electric Company, Schenectady, NY (US)

(72) Inventors: Alfred Albert Mancini, Cincinnati, OH (US); Daniel Alan Niergarth, Norwood, OH (US); Ethan Patrick O'Connor, Hamilton, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 16/864,646

(22) Filed: May 1, 2020

(65) Prior Publication Data

US 2021/0340916 A1 Nov. 4, 2021

(51) Int. Cl.
*F02C 9/28* (2006.01)
*F02C 9/44* (2006.01)
*F02C 7/22* (2006.01)
*F23K 5/08* (2006.01)

(52) U.S. Cl.
CPC .................. *F02C 9/28* (2013.01); *F02C 7/22* (2013.01); *F02C 9/44* (2013.01); *F23K 5/08* (2013.01); *F05D 2220/323* (2013.01); *F05D 2270/303* (2013.01); *F05D 2270/3061* (2013.01); *F23K 2900/05082* (2013.01)

(58) Field of Classification Search
CPC ...... F02C 9/28; F02C 9/44; F02C 7/22; F02K 5/08; F23K 2900/05082; B64D 37/34; F23R 2900/00004; F05D 2270/303
See application file for complete search history.

(56) References Cited

U.S. PATENT DOCUMENTS

| 4,809,500 | A  | * | 3/1989 | Roberts, Jr. ............... F02C 9/28 60/235 |
| 6,244,034 | B1 |   | 6/2001 | Taylor et al. |
| 6,939,392 | B2 | * | 9/2005 | Huang ............... B01D 19/0031 95/46 |
| 7,074,259 | B2 |   | 7/2006 | Liebig |
| 7,377,112 | B2 | * | 5/2008 | Spadaccini ............. F02C 7/224 60/772 |

(Continued)

FOREIGN PATENT DOCUMENTS

EP 0277904 A3 * 7/1989 ............... F02K 1/17
EP 3623030 A1 3/2020

*Primary Examiner* — Alain Chau
(74) *Attorney, Agent, or Firm* — Dority & Manning, P.A.

(57) ABSTRACT

In one exemplary embodiment of the present disclosure, a method of operating a fuel system for an aeronautical gas turbine engine is provided. The method includes: providing a flow of fuel to a fuel nozzle of the aeronautical gas turbine engine during a wind down condition; operating a fuel oxygen reduction unit to reduce an oxygen content of the flow of fuel provided to the fuel nozzle of the aeronautical gas turbine engine during the wind down condition; and ceasing providing the flow of fuel to the fuel nozzle of the aeronautical gas turbine engine, the fuel nozzle comprising a volume of fuel after ceasing providing the flow of fuel to the fuel nozzle; wherein operating the fuel oxygen reduction unit comprises operating the fuel oxygen reduction unit to reduce an oxygen content of the volume of fuel in the fuel nozzle to less than 20 parts per million.

20 Claims, 7 Drawing Sheets

(56) References Cited

U.S. PATENT DOCUMENTS

| | | | |
|---|---|---|---|
| 7,615,104 B2 | 11/2009 | Cordatos et al. | |
| 7,744,827 B2* | 6/2010 | Vanderspurt | F23K 5/08 |
| | | | 422/612 |
| 9,687,773 B2 | 6/2017 | Johnson et al. | |
| 9,834,315 B2 | 12/2017 | Lo et al. | |
| 9,863,322 B2* | 1/2018 | Williams | F02C 7/22 |
| 10,815,906 B2* | 10/2020 | Veilleux, Jr. | F01P 3/00 |
| 11,085,636 B2* | 8/2021 | O'Connor | F02C 3/20 |
| 2005/0180901 A1* | 8/2005 | Vanderspurt | F23K 5/08 |
| | | | 422/211 |
| 2007/0006591 A1* | 1/2007 | Spadaccini | F23K 5/08 |
| | | | 60/772 |
| 2007/0101731 A1 | 5/2007 | Bayt et al. | |
| 2015/0204244 A1* | 7/2015 | Williams | F23K 5/04 |
| | | | 60/776 |
| 2018/0347398 A1 | 12/2018 | Falkus et al. | |
| 2018/0347517 A1* | 12/2018 | Staroselsky | F02M 27/08 |
| 2019/0153952 A1 | 5/2019 | Niergarth et al. | |
| 2019/0277201 A1* | 9/2019 | Veilleux, Jr. | F02C 7/232 |
| 2020/0086239 A1 | 3/2020 | Cordatos et al. | |
| 2020/0141574 A1* | 5/2020 | O'Connor | F02C 3/20 |
| 2020/0141575 A1* | 5/2020 | O'Connor | F23K 5/04 |

\* cited by examiner

FUEL OXYGEN REDUCTION UNIT

FIELD

The present subject matter relates generally to a fuel oxygen reduction unit for a vehicle, and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount.

BRIEF DESCRIPTION

Aspects and advantages of the invention will be set forth in part in the following description, or may be obvious from the description, or may be learned through practice of the invention.

In one exemplary embodiment of the present disclosure, a method of operating a fuel system for an aeronautical gas turbine engine is provided. The method includes: providing a flow of fuel to a fuel nozzle of the aeronautical gas turbine engine during a wind down condition; operating a fuel oxygen reduction unit to reduce an oxygen content of the flow of fuel provided to the fuel nozzle of the aeronautical gas turbine engine during the wind down condition; and ceasing providing the flow of fuel to the fuel nozzle of the aeronautical gas turbine engine, the fuel nozzle comprising a volume of fuel after ceasing providing the flow of fuel to the fuel nozzle; wherein operating the fuel oxygen reduction unit comprises operating the fuel oxygen reduction unit to reduce an oxygen content of the volume of fuel in the fuel nozzle to less than 20 parts per million.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
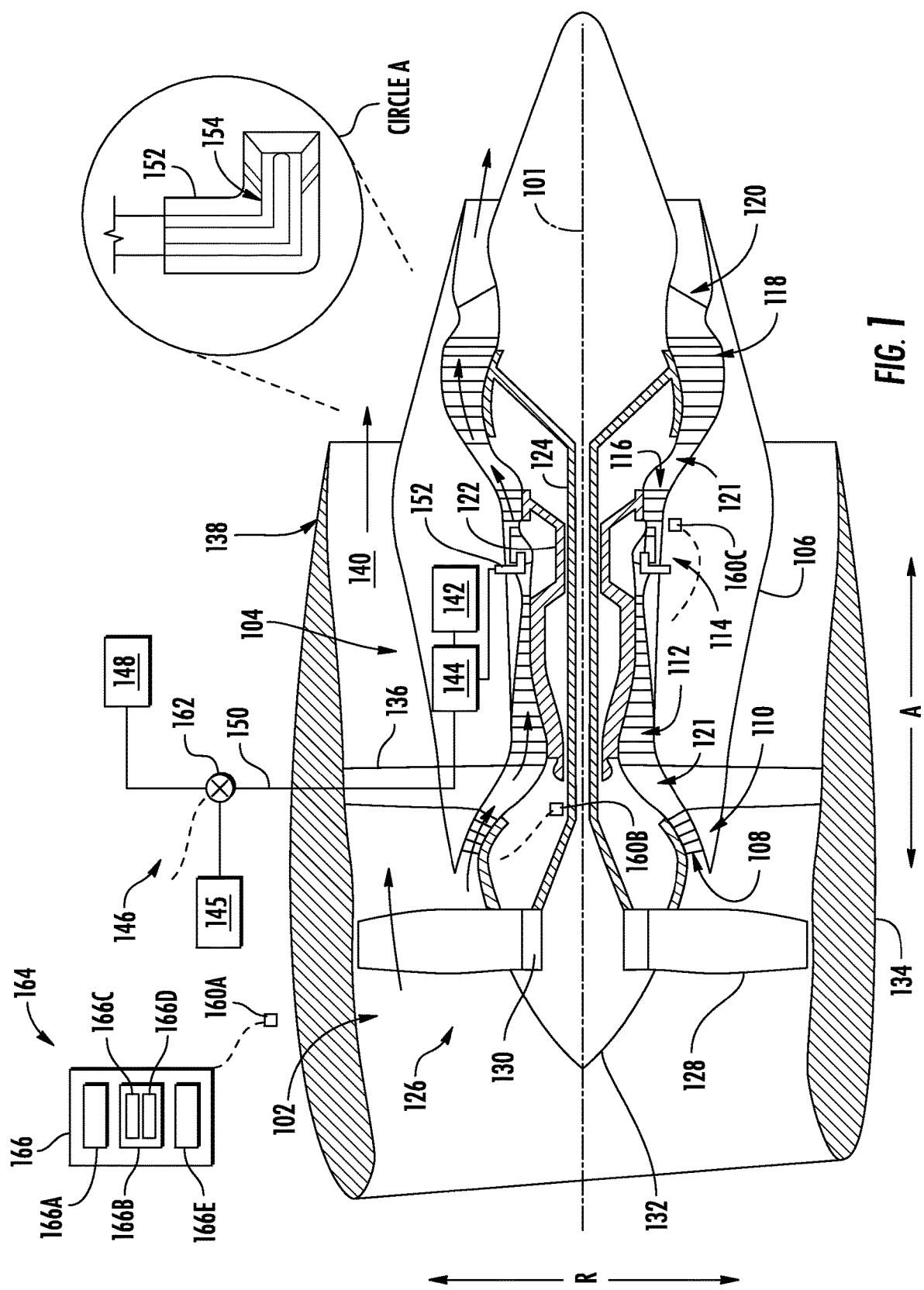
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

For purposes of the description hereinafter, the terms "upper," "lower," "right," "left", "vertical", "horizontal", "top", "bottom", "lateral", "longitudinal", and derivatives thereof shall relate to the invention as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As noted above, the inventors of the present disclosure have found that it may be necessary to condition fuel to withstand relatively high temperatures during shutdown conditions of the engine. Aspects of the present disclosure are configured to address such a need by ensuring a volume of fuel remaining in the fuel nozzles of the engine are appropriately conditioned to withstand any additional heat they absorb without coking or otherwise deteriorating beyond a certain threshold.

More specifically, certain exemplary aspects of the disclosure include providing a flow of fuel to a fuel nozzle of the aeronautical gas turbine engine during a wind down condition of the engine and operating a fuel oxygen reduction unit to reduce an oxygen content of the flow of fuel provided to the fuel nozzle of the aeronautical gas turbine engine during the wind down condition. The method may then cease providing the flow of fuel to the fuel nozzle of the aeronautical gas turbine engine, such that a volume of fuel remains within the fuel nozzle when the engine is shut-down and no longer operating. In these aspects, fuel is not pumped or scavenged out of the fuel nozzle.

With such an exemplary aspect, operating the fuel oxygen reduction unit may include operating the fuel oxygen reduction unit to reduce an oxygen content of the volume of fuel in the fuel nozzle to less than 20 parts per million, such as to less than 15 parts per million. In such a manner, as residual heat stored in the thermal mass heats up components of the engine, including the fuel nozzles, after the engine is shut down, the volume of fuel remaining within the fuel nozzle may be configured to withstand the high temperatures achieved without coking beyond a certain threshold, thus preventing the fuel nozzle from being damaged or worn more quickly than designed.

Notably, as the engine is going through the wind down condition, and, e.g., transitioning from a ground idle condition to a completely shut down condition, the rotating components of the engine create an airflow through the engine, preventing the fuel nozzles form achieving the higher temperatures. Additionally, during these conditions the fuel is still flowing through the fuel nozzles and not just sitting idle. Accordingly, the risk of fuel coking may be higher after the engine is completely shut down than when the engine is operating (even if at lower speeds).

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a primary fuel oxygen reduction unit or system 144, a secondary fuel oxygen reduction unit 145, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the primary fuel oxygen reduction unit 144 may be coupled to, or otherwise rotatable with, the accessory gearbox 142. In such a manner, it will be appreciated that the exemplary primary fuel oxygen reduction unit 144 may be driven by the accessory gearbox 142. In other exemplary embodiments, the exemplary primary fuel oxygen reduction unit 144 may be driven by other sources. Notably, as used herein, the term "fuel oxygen reduction" generally means a device capable of reducing a free oxygen content of the fuel.

Moreover, the fuel delivery system 146 generally includes a fuel source 148, such as a fuel tank, and a fuel delivery assembly (which may include one or more fuel lines) 150. The fuel delivery assembly 150 provides a fuel flow through the fuel delivery system 146 to the combustion section 114 of the turbomachine 104 of the turbofan engine 100. The combustion section 114 includes a plurality of fuel nozzles 152 arranged, for the embodiment shown, circumferentially about the centerline axis 101. A close-up view of one of the fuel nozzles 152 is shown in the callout Circle A. As shown, the fuel nozzle 152 defines a plurality of fuel flow passages 154. As will be appreciated, these fuel flow passages 154 define a volume, such that when fuel flow to the nozzle 152 ceases, a volume of fuel remains within the nozzle 152. The volume of fuel may be at least 10 milliliters of fuel, such as at least 20 milliliters of fuel, such as at least 50 milliliters of fuel, such as at least 100 milliliters of fuel and up to three (3) liters of fuel.

During typical operations, the primary fuel oxygen reduction unit 144 may operate to reduce an oxygen content of a fuel flow to the combustion section 114, and more particularly to the fuel nozzles 152. During a wind down condition (defined below), however, it may be necessary to further reduce an oxygen content of the fuel. For example, depending on, e.g., a thermal mass of a core of the engine 100 and a turbine inlet temperature, also referred to as a "T3 temperature," during an idle condition of the engine, heat from the core of the engine 100 may "soak-back" to the fuel nozzles 152, heating the volume of fuel remaining within the fuel nozzles 152 to a point that the volume of fuel remaining within the fuel nozzles 152 would coke unless an oxygen content of such volume of fuel is reduced below the levels provided by the primary fuel oxygen reduction unit 144.

Accordingly, as will be explained in more detail below, the secondary fuel oxygen reduction unit 145 may be operated during the wind down condition to ensure that the volume of fuel remaining within the fuel nozzle 152 after the engine has shut down is sufficiently low to prevent the fuel flow coking or otherwise deteriorating past an undesired level when the heat from the core of the engine 100 soaks-back to the fuel nozzle 152.

Notably, a controller is also provided operable with the turbofan engine 100, the fuel system 146, or both to control operations of certain aspects of the turbofan engine 100, the fuel system 146, or both to ensure the volume of fuel remaining within the fuel nozzle 152 has an oxygen content below a desired level after the fuel flow to the fuel nozzle 152 has ceased. The aircraft, the turbofan engine 100, the fuel system 146, or combinations thereof may include a variety of sensors 160 to sense information indicative of various operating conditions of the turbofan engine 100, the fuel system 146, or both, which the controller may base control decisions off of. For example, the exemplary aircraft system shown in FIG. 1 generally includes a aircraft sensor 160A, an engine rotational speed sensor 160B, and an engine temperature sensor 160C. The aircraft sensor 160A may sense data indicative of, e.g., a weight on any wheels of the aircraft (indicating that the aircraft is on the ground), an altitude of the aircraft, an operating condition of the aircraft (e.g., takeoff mode, cruise mode, taxi mode, shutdown mode, etc.), etc. The engine rotational speed sensor 160B may sense data indicative of a rotational speed of a shaft of the engine (such as shafts 122, 124), the fan 126, etc. The engine temperature sensor 160C may sense data indicative of a temperature of the engine, such as the turbine inlet temperature (as shown), compressor exit temperature, etc.

Further, it will be appreciated that the fuel system 146 further includes a control valve 162 operable with the fuel delivery assembly 150, to selectively provide a fluid flow connection between the secondary fuel oxygen reduction unit 145 and the fuel nozzles 152. The controller is operably coupled to the control valve 162 and may control operation of the control valve 162 based on, e.g., data received from the sensors 160.

In one or more exemplary embodiments, the controller 164 depicted in FIG. 1 may be a stand-alone controller 164, or alternatively, may be integrated into one or more of a controller for the aircraft with which the fuel delivery system 146 is integrated, a controller for the turbofan engine 100 receiving fuel from the fuel delivery system 146, etc.

Referring particularly to the operation of the controller 164, in at least certain embodiments, the controller 164 can include one or more computing device(s) 166. The computing device(s) 166 can include one or more processor(s) 166A and one or more memory device(s) 166B. The one or more processor(s) 166A can include any suitable processing device, such as a microprocessor, microcontroller, integrated circuit, logic device, and/or other suitable processing device. The one or more memory device(s) 166B can include one or more computer-readable media, including, but not limited to, non-transitory computer-readable media, RAM, ROM, hard drives, flash drives, and/or other memory devices.

The one or more memory device(s) 166B can store information accessible by the one or more processor(s) 166A, including computer-readable instructions 166C that can be executed by the one or more processor(s) 166A. The instructions 166C can be any set of instructions that when executed by the one or more processor(s) 166A, cause the one or more processor(s) 166A to perform operations. In some embodiments, the instructions 166C can be executed by the one or more processor(s) 166A to cause the one or more processor(s) 166A to perform operations, such as any of the operations and functions for which the controller 164 and/or the computing device(s) 166 are configured, the operations for operating a fuel delivery system 100 (e.g., method 300), as described herein, and/or any other operations or functions of the one or more computing device(s) 166. The instructions 166C can be software written in any suitable programming language or can be implemented in hardware. Additionally, and/or alternatively, the instructions 166C can be executed in logically and/or virtually separate threads on processor(s) 166A. The memory device(s) 166B can further store data 166D that can be accessed by the processor(s) 166A. For example, the data 166D can include data indicative of engine/aircraft operating conditions, and/or any other data and/or information described herein.

The controller 164 is operably coupled to the one or more sensors 160 through, e.g., the network interface 166E (see, e.g., dotted lines in FIG. 1), such that the controller 164 may receive data indicative of various operating parameters and other data sensed by the one or more sensors 160 during operation. Further, for the embodiment shown the controller 164 is operably coupled to, e.g., the control valve 162. In such a manner, the controller 164 may be configured to actuate the control valve 162 in response to, e.g., the data sensed by the one or more sensors 160.

The network interface 166E can include any suitable components for interfacing with one or more network(s), including for example, transmitters, receivers, ports, controllers, antennas, and/or other suitable components.

It will be appreciated, that as used herein, the term "wind down condition" of an engine refers to an operating condition or sequence of operating conditions occurring as the gas turbine engine transitions to being in a completely turned-off condition (i.e., when fuel is no longer provided to the fuel nozzles 152, and the shafts 124 and 122 are not rotating, or rotating at a low speed, e.g., less than 75 revolutions per minute). The wind down condition may include a ground idling condition of the engine as the engine is taxiing to its gate (e.g., for commercial aircraft) or hanger, and/or a shutdown sequence of the engine in which it transitions from the ground idling condition to the completely turned off condition.

It will further be appreciated that the term "thermal mass of the core" refers to a thermal mass defined by the various rotor blades and stator vanes of the high pressure compressor 112 and the high pressure turbine 116, as well as the HP spool 122. A relatively high thermal mass of the core of the turbofan engine 100 may render the fuel nozzles 152 more susceptible to fuel coking as a result of heat soak-back.

Similarly, it will be appreciated that a temperature of the core of the engine during idle conditions during and/or leading up to the wind down condition may affect the susceptibility of the volume of fuel within the fuel nozzle 152 after fuel flow thereto has ceased to fuel coking as a result of heat soak-back. In certain exemplary embodiments, the turbine inlet temperature, T3, which may be indicative of an overall temperature of the core, may be at least 1000 degrees Fahrenheit during idle standard day conditions (e.g., sea level and 70 degrees Fahrenheit ambient), such as at least 1100 degrees Fahrenheit, such as at least 1250 degrees Fahrenheit, such as at least 1400 degrees Fahrenheit, such as at least 1500 degrees Fahrenheit, such as at least 1550 degrees Fahrenheit, and up to 3500 degrees Fahrenheit.

Notably, the secondary fuel oxygen reduction unit 145 is designed to operate substantially exclusively during the wind down condition, and is not configured to reduce an oxygen content of a fuel flow during flight operations. In such manner, it will be appreciated that secondary fuel oxygen reduction unit 145 may define a maximum operating time of, e.g., one hour or less per flight mission, such as 30 minutes or less per flight mission. The maximum operating time refers to a maximum amount of time the secondary fuel oxygen reduction unit 145 may reduce an oxygen content of a flow of fuel at, e.g., engine idle fuel flow levels, within about 50 percent of its maximum efficiency. Similarly, in certain exemplary embodiments, it will be appreciated that the aircraft in which the turbofan engine 100 and fuel system 146 are incorporated may define a maximum fuel capacity (e.g., maximum fuel capacity of the tank 148), and the secondary fuel oxygen reduction unit 145 may define a maximum volume of fuel throughput per flight mission, with the maximum volume of fuel throughput being less than 10 percent of the maximum fuel capacity of the aircraft, such as less than 5 percent of the maximum fuel capacity of the aircraft. The maximum volume of fuel throughput per flight mission of the secondary fuel oxygen reduction unit 145 may refer to a maximum amount of fuel the secondary fuel oxygen reduction unit 145 may effectively treat at a level within about 50 percent of its maximum efficiency.

In addition, it will be appreciated that secondary fuel oxygen reduction unit 145 may define a maximum fuel flowrate. The maximum fuel flowrate capacity refers to a maximum flowrate of fuel that the secondary fuel oxygen reduction unit 145 may effectively treat (i.e., reduce an oxygen content within about 50 percent of its maximum efficiency). It will be appreciated that the aircraft in which the turbofan engine 100 and fuel system 146 are incorporated may define a cruise condition flowrate equal to a flowrate of fuel to the turbofan engine 100 during a cruise condition. The maximum fuel flowrate capacity of the secondary fuel oxygen reduction unit 145 is less than the cruise condition flowrate. Further, the aircraft in which the turbofan engine 100 and fuel system 146 are incorporated may further define a maximum fuel flowrate to the turbofan engine 100 (e.g., a total fuel flowrate to the turbofan engine 100 when the turbofan engine 100 is operated at a rated speed), and the secondary fuel oxygen reduction unit 145 may define a maximum fuel flowrate capacity equal to about 40 percent or less of the maximum fuel flowrate to the turbofan engine 100, such as about 30 percent or less, such as 20 percent or less, such as 10 percent or less, such as at least 1 percent. For example, the secondary fuel oxygen reduction unit 145 may be configured to effectively treat up to 15 gallons per minute of fuel, such as up to 13 gallons per minute of fuel, such as up to 11 gallons per minute of fuel, such as at least 0.5 gallons per minute of fuel.

It will accordingly be appreciated from the discussion herein that the various systems may be operated to reduce a risk of the volume of fuel remaining in each fuel nozzle 152 after the fuel flow to the fuel nozzles 152 has ceased from coking or otherwise deteriorating more than a threshold amount. For example, the various systems may operate the secondary fuel oxygen reduction unit 145 to reduce an oxygen content of the volume of fuel in each fuel nozzle 152 to less than 20 parts per million, such as to less than 15 parts per million, such as to less than 13 parts per million, such as to less than 12 parts per million, such as to less than 11 parts per million, such as to less than 10 parts per million, such as to less than 9 parts per million, such as to less than 8 parts per million, such as to less than 7 parts per million, such as to less than 6 parts per million, such as to less than 5 parts per million.

Moreover, it will be appreciated that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the primary fuel oxygen reduction unit 144 and the secondary fuel oxygen reduction unit 145, in other embodiments, the turbofan engine 100 and/or aircraft incorporating the turbofan engine 100 may only include one of such primary fuel oxygen reduction unit 144 and secondary fuel oxygen reduction unit 145. Additionally, or alternatively, in certain embodiments the primary fuel oxygen reduction unit 144 (if included) may not be positioned within the turbomachine 104, i.e., within the casing 106 of the turbomachine 104, and instead may be positioned at any other suitable location.

Further, in still other exemplary embodiments, the turbofan engine 100 (or other gas turbine engine in accordance with one or more exemplary embodiments of the present disclosure), the "secondary fuel oxygen reduction unit 145" may be the only fuel oxygen reduction unit for the engine. Further, in such a configuration, or others, the secondary fuel oxygen reduction unit 145 may be configured to operate through multiple flight phases/conditions, including one or more of takeoff, climb, cruise, descent, idle, taxi, etc., in addition to the wind down condition. In such a manner, it will be appreciated that the fuel oxygen reduction unit 145 may be configured to operate substantially continuously throughout operation of the engine. In such a configuration, the limitations discussed herein with respect to the maximum throughput of such secondary fuel oxygen reduction unit 145 may still apply.

Figure 2:
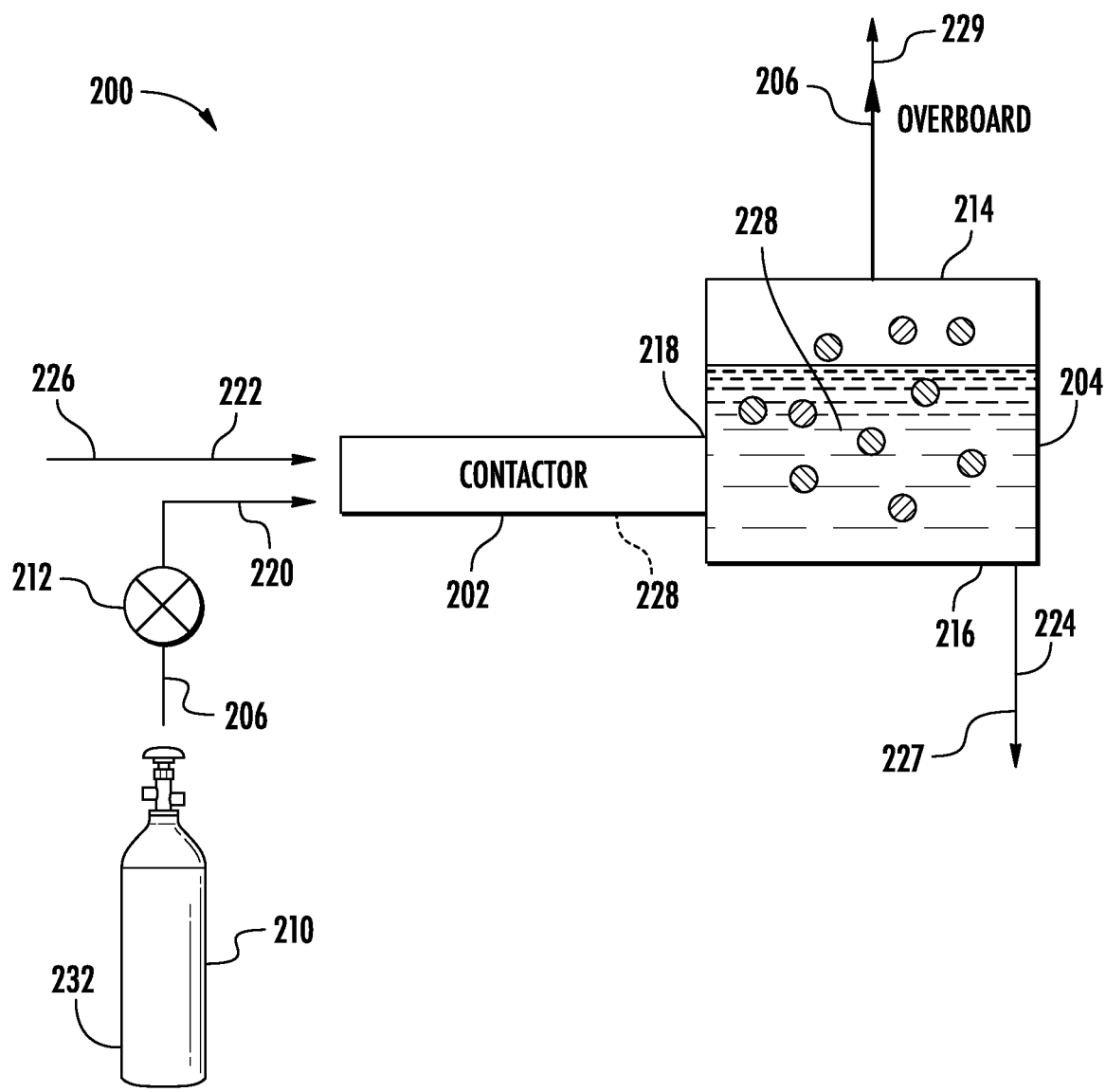
FIG. 2 is a schematic view of a fuel oxygen reduction unit in accordance with an exemplary embodiment of the present disclosure.

Referring now to FIG. 2, a schematic drawing of a fuel oxygen reduction unit 200 for a gas turbine engine in accordance with an exemplary embodiment of the present disclosure is provided. In at least certain exemplary embodiments, the exemplary fuel oxygen reduction unit 200 depicted may be incorporated into, e.g., the exemplary engine 100 and/or fuel delivery system 146 described above with reference to FIG. 1 (e.g., may be the secondary fuel oxygen reduction unit 145 depicted in FIG. 1 and described above, or the primary fuel oxygen reduction unit 144). Fuel oxygen reduction unit 200 of the present disclose may be a static system that is configured and sized for operating at a prescribed operating condition. Additionally, fuel oxygen reduction unit 200 of the present disclose can be retrofitted on existing engine systems and/or incorporated into a new engine system.

As will be appreciated from the discussion herein, in an exemplary embodiment, the exemplary fuel oxygen reduction unit 200 of FIG. 2 generally includes a contactor 202, a separator 204, a stripping gas source 210, and a valve 212. In an exemplary embodiment, the exemplary fuel oxygen reduction unit 200 generally defines a single pass gas flowpath or system 206 from the stripping gas source 210 to the contactor 202 and out the separator 204 as described herein.

In exemplary embodiments, the contactor 202 may be configured in any suitable manner to substantially mix a received gas and liquid flow. For example, the contactor 202 may, in certain embodiments, be a mechanically driven contactor (e.g., having paddles for mixing the received flows), or alternatively may be a passive contactor for mixing the received flows using, at least in part, a pressure and/or flowrate of the received flows. For example, a passive contactor may include one or more turbulators, a venturi mixer, etc.

It will be appreciated that the fuel oxygen reduction unit 200 generally provides for a flow of stripping gas 220 to the contactor 202 for mixing with a fuel flow during operation. It will be appreciated that the term "stripping gas" is used herein as a term of convenience to refer to a gas generally capable of performing the functions described herein. The stripping gas 220 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Referring to FIG. 2, in an exemplary embodiment, the separator 204 generally includes a stripping gas outlet 214, a fuel outlet 216, and an inlet 218. It will also be appreciated that the exemplary fuel oxygen reduction unit 200 depicted is operable with a fuel delivery system, such as a fuel delivery system of the gas turbine engine including the fuel oxygen reduction unit 200 (see, e.g., the fuel delivery system 146 of FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel or inlet fuel flow 226 to the contactor 202 (e.g., from a fuel source, such as a fuel tank) and the outlet fuel line 224 is fluidly connected to the fuel outlet 216 of the separator 204 for receiving a flow of deoxygenated liquid fuel or outlet fuel flow 227.

Moreover, during typical operations, a flow of stripping gas 220 flows to the contactor 202, wherein the stripping gas 220 is mixed with the flow of inlet fuel 226 from the inlet fuel line 222 to generate a fuel gas mixture 228. The fuel gas mixture 228 generated within the contactor 202 is provided to the inlet 218 of the separator 204. The stripping gas source 210 is selectively in fluid communication with a stripping gas inlet of the contactor 202 for selectively introducing a stripping gas to the contactor 202.

For the embodiment depicted, the stripping gas source 210 is in fluid communication with the contactor 202 via the valve 212, which may be actuatable to supply the stripping gas flow 220 to the contactor 202 at a prescribed operating condition. Referring still to FIG. 2, the valve 212 is downstream of the stripping gas source 210 and upstream of the contactor 202. The valve 212 is transitionable between a closed position in which the stripping gas source 210 is not in fluid communication with the contactor 202, and an open position in which the stripping gas 220 flows to the contactor 220. As described herein, the valve 212 transitions to the open position at a prescribed operating condition. In this manner, the fuel oxygen reduction unit 200 of the present disclosure may operate only during desired engine parameters, e.g., parameters indicating the engine is at the end of the cycle, such as during an engine wind down condition. This enables the fuel oxygen reduction unit 200 of the present disclosure to be a static, smaller, and lighter unit to deoxygenate the fuel at the end of an engine cycle, for example, to prevent coking of a volume of fuel remaining a fuel nozzle after a flow of fuel to the fuel nozzle has ceased. In other words, the fuel oxygen reduction unit 200 of the present disclosure lowers the oxygen content of the fuel, such that a relatively high amount of heat may be added thereto with a reduced risk of the fuel coking (i.e., chemically reacting to form solid particles which may clog up or otherwise damage components within the fuel flow path). As discussed above, such may occur during after a wind down condition of the engine, referred to as soak-back.

Generally, it will be appreciated that during operation of the fuel oxygen reduction unit 200, the inlet fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the inlet fuel 226 is mixed with the stripping gas 220, resulting in the fuel gas mixture 228. As a result of such mixing a physical exchange may occur whereby at least a portion of the oxygen within the inlet fuel 226 is transferred to the stripping gas 220, such that the fuel component of the mixture 228 has a relatively low oxygen content (as compared to the inlet fuel 226 provided through inlet fuel line 222) and the stripping gas component of the mixture 228 has a relatively high oxygen content (as compared to the inlet stripping gas 220 provided to the contactor 202).

Within the separator 204 the relatively high oxygen content stripping gas 220 is then separated from the relatively low oxygen content fuel 226 back into respective flows of an outlet stripping gas 229 and outlet fuel 227. The separator 204 is configured to separate the fuel/gas mixture 228 into an outlet stripping gas flow 229 and an outlet fuel flow 227 and provide the outlet stripping gas flow 229 to the stripping gas outlet 214 and the outlet fuel flow 227 to the fuel outlet 216. In an exemplary embodiment, the outlet stripping gas flow 229 is vented out to atmosphere downstream of the separator 204.

Further, it will be appreciated that the outlet fuel 227 provided to the fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path).

Referring still to FIG. 2, in an exemplary embodiment, the stripping gas source 210 is a rechargeable bottle of inert gas 232. The bottle of inert gas 232 could be positioned somewhere on the engine 100 or aircraft. The bottle 232 stores an amount of inert gas that is oxygen free, e.g., a CO2 or N2 gas. The bottle 232 can be recharged at standard intervals, such as between flight missions of the aircraft, or after a certain number of flight missions of the aircraft.

Figure 3:
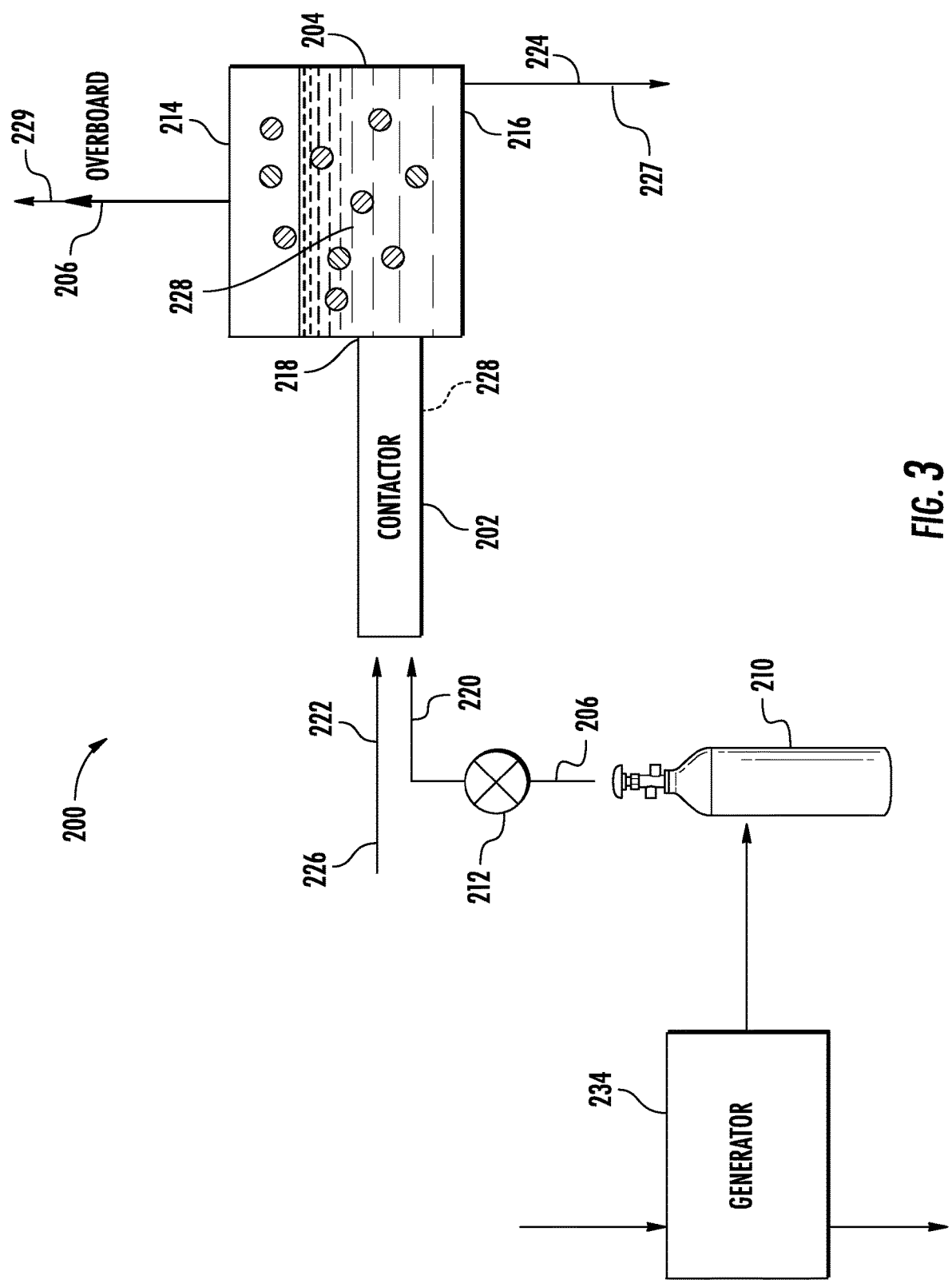
FIG. 3 is a schematic view of a fuel oxygen reduction unit in accordance with another exemplary embodiment of the present disclosure.

It will be appreciated, however, that in other embodiments, the stripping gs source may be any other suitable source of stripping gas. For example, referring now to FIG. 3, in an exemplary embodiment, the stripping gas source 210 may be an inert gas generator 234. The inert gas generator 234 is a device configured to take air from some source, e.g., air from atmosphere, air from a pump, air from a compressor bleed of an engine, etc. and generate a continuous supply of inert gas. In an exemplary embodiment, the inert gas generator 234 may be used to continuously replenish a supply of inert gas to the bottle of inert gas 232 described above.

Figure 4:
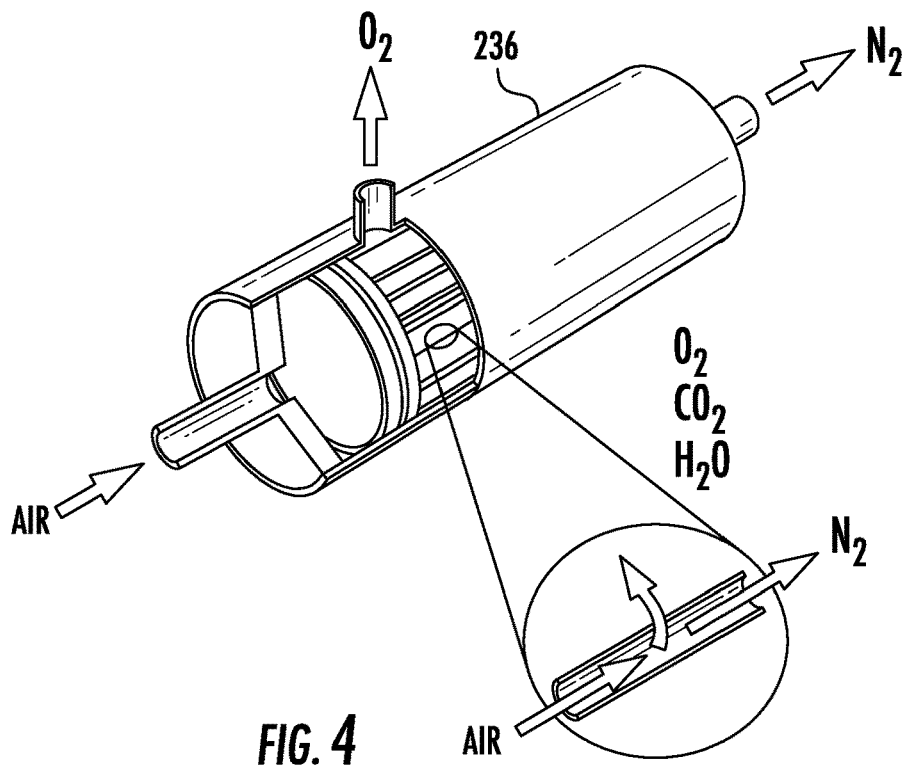
FIG. 4 is a schematic view of an inert gas generator in accordance with an exemplary embodiment of the present disclosure.
Figure 5:
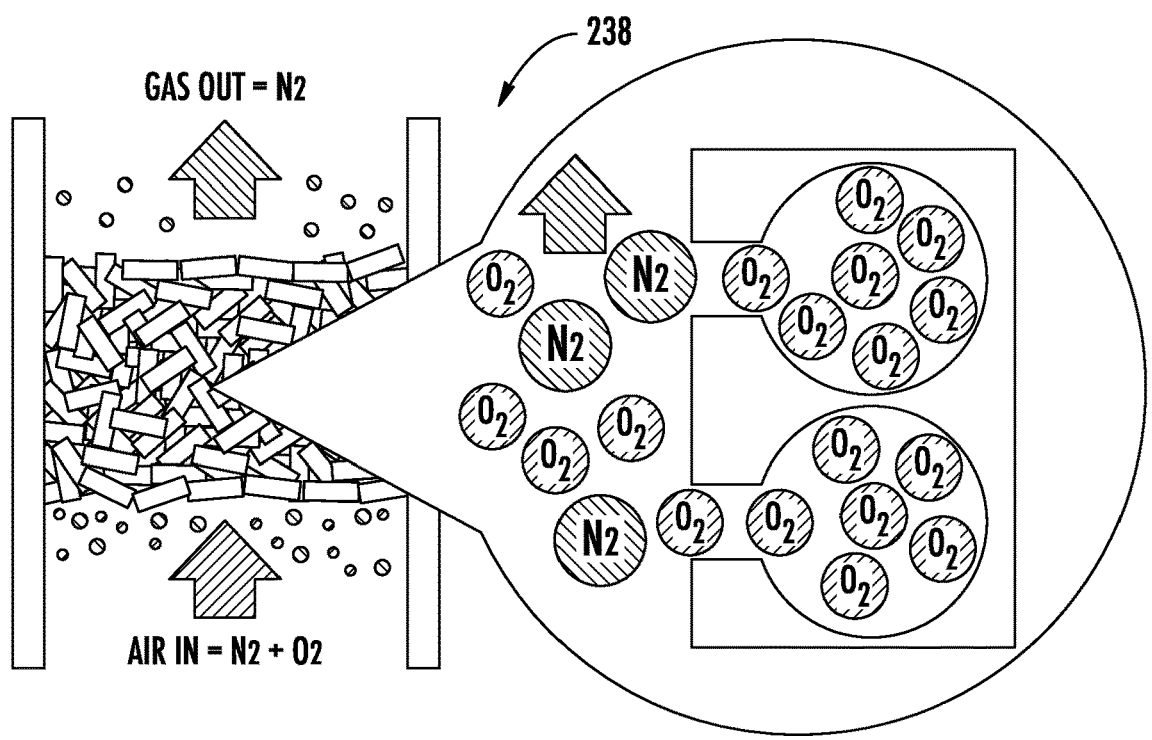
FIG. 5 is a schematic view of an inert gas generator in accordance with another exemplary embodiment of the present disclosure.

The inert gas generator 234 may be configured in any suitable manner. For example, FIGS. 4 and 5 depict two exemplary embodiments of an inert gas generator 234 as may be incorporated into the system of FIG. 3. For example, referring to FIG. 4, in a first exemplary embodiment, the inert gas generator 234 includes a membrane 236. The membrane 236 separates oxygen out from nitrogen, for example. In this manner, an oxygen free stripping gas may be continuously provided to the system. Additionally, or alternatively, referring to FIG. 5, in a second exemplary embodiment, the inert gas generator 234 may be a pressure swing adsorption (PSA) system 238. The PSA system 238 is used to separate a first gas species from a mixture of gases under pressure according to the species' molecular characteristics and affinity for an adsorbent material. The PSA system 238 of the present disclosure separates a gas such as nitrogen, for example, from oxygen. In this manner, an oxygen free stripping gas is continuously provided to the system.

It will be appreciated, however, that the exemplary fuel oxygen reduction unit 200 described above is provided by way of example only, and that in other embodiments, the fuel oxygen reduction unit 200 may have any other suitable configuration. For example, referring now to FIG. 6, a schematic drawing of a fuel oxygen reduction system 200 in accordance with another exemplary embodiment of the present disclosure is provided. In at least certain exemplary embodiments, the exemplary fuel oxygen reduction system 200 depicted may be incorporated into, e.g., the exemplary engine 100 described above with reference to FIG. 1 (e.g., may be the secondary fuel oxygen reduction unit 145, or may be the primary fuel oxygen reduction unit 144 depicted in FIG. 1 and described above).

Figure 6:
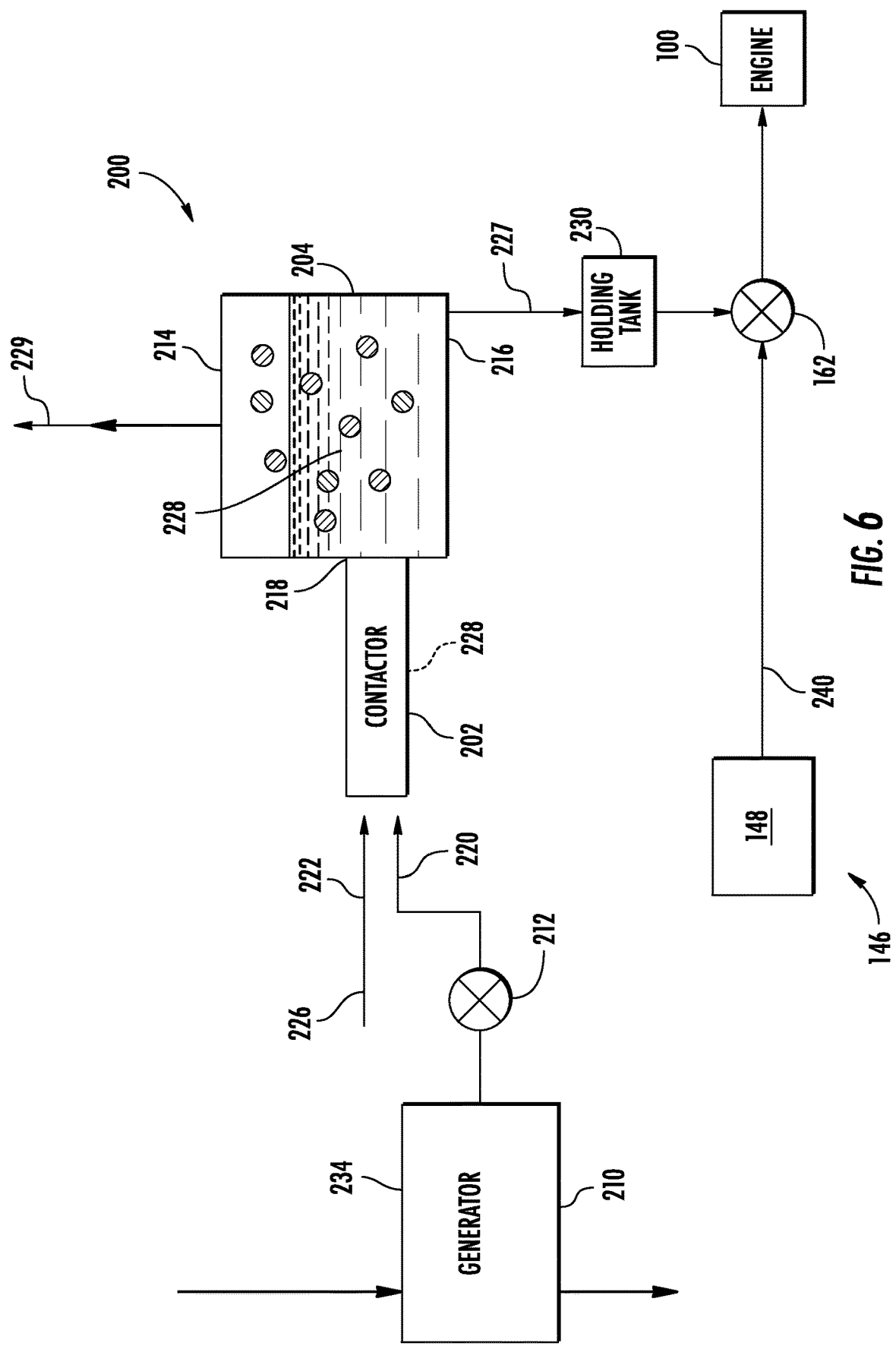
FIG. 6 is a schematic view of a fuel oxygen reduction system in accordance with an exemplary embodiment of the present disclosure.

The embodiment illustrated in FIG. 6 may be configured in a similar manner as the exemplary embodiment illustrated in FIGS. 2 through 5. However, for the embodiment depicted, the fuel oxygen reduction unit 200 does not include a separate tank 210 and is configured to provide stripping gas 220 generated from the inert gas generator 234.

Further, it will be appreciated that for the embodiment shown the outlet fuel 227 provided to the fuel outlet 216, having interacted with the stripping gas 220, is provided to and stored in a storage tank 230 and can be provided to the engine at a prescribed operating condition. Such may allow for the fuel oxygen reduction unit 200 to be operated at a relatively low throughput for a longer amount of time to generate a sufficient amount of low-oxygen-content fuel for use in the wind down condition to ensure the volume of fuel remaining in the fuel nozzles 152 after shutdown defines a sufficiently low oxygen content.

Referring to FIG. 6, in an exemplary embodiment, the fuel oxygen reduction system 200 is operable with a fuel delivery system 146, which includes a primary tank 148 containing a primary fuel flow 240 and a control valve 162 that is downstream of the storage tank 148 and that is downstream of the storage tank 230. The primary fuel flow 240 has a higher oxygen content than the deoxygenated fuel 227. The control valve 162 may be actuated to provide the low-oxygen-content fuel for use in the wind down condition to ensure the volume of fuel remaining in the fuel nozzles 152 defines a sufficiently low oxygen content.

Figure 7:
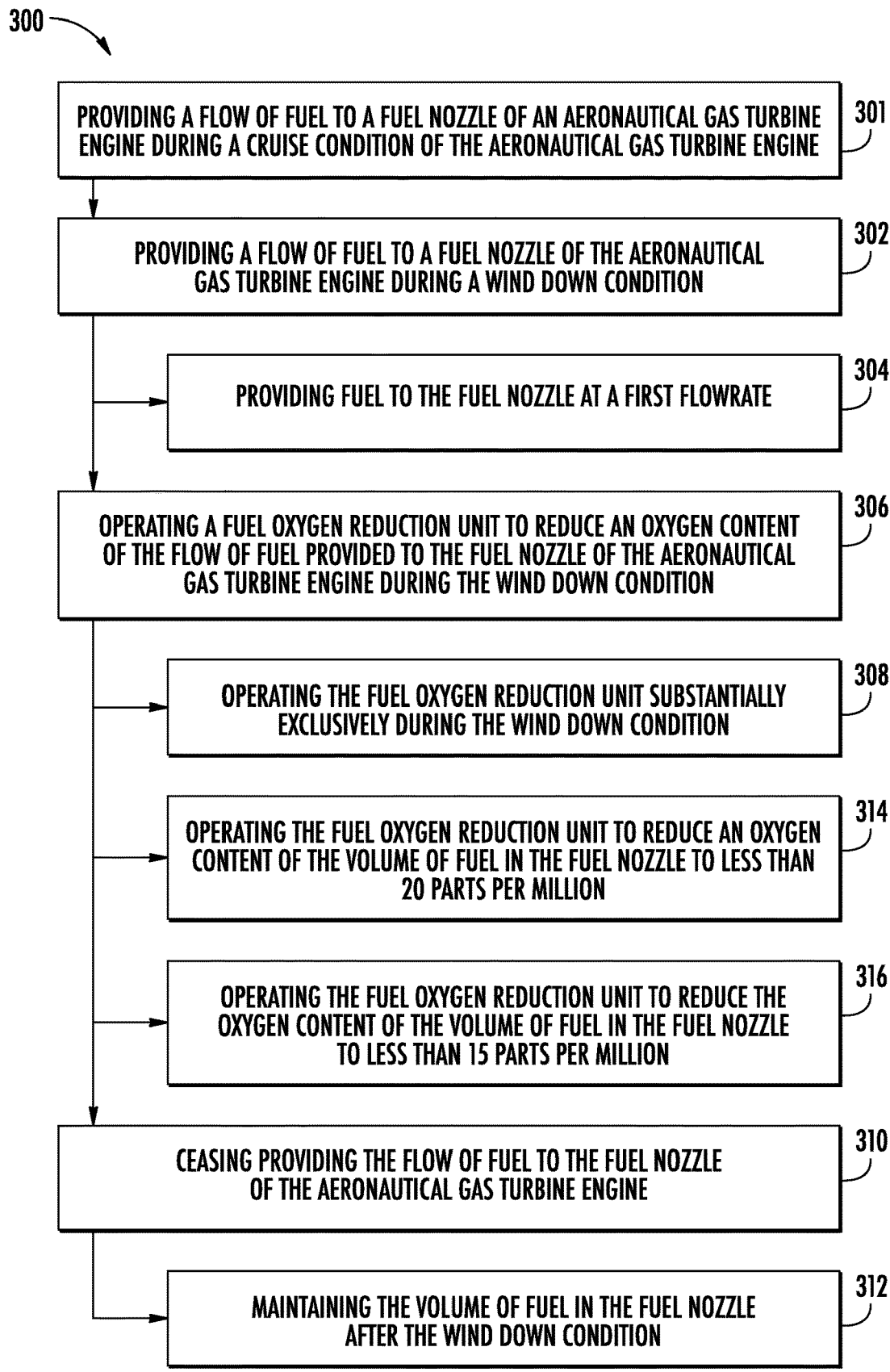
FIG. 7 is a flow diagram of a method of operating a fuel system for an aeronautical gas turbine engine in accordance with an aspect of the present disclosure.

Referring now to FIG. 7, a flow diagram of a method 300 of operating a fuel system for an aeronautical gas turbine engine is provided. The method 300 may be utilized with one or more of the exemplary fuel systems, gas turbine engines, etc. described above, or alternatively may be utilized with any other suitable fuel system.

The method 300 includes operating the aeronautical gas turbine engine during a cruise condition. More specifically, the method 300 includes at (301) providing a flow of fuel to a fuel nozzle of the aeronautical gas turbine engine during a cruise condition of the aeronautical gas turbine engine. The method 300 further includes operating the aeronautical gas turbine engine in a wind down condition. More specifically, the method 300 includes at (302) providing a flow of fuel to the fuel nozzle of the aeronautical gas turbine engine during a wind down condition. The wind down condition, as noted above, may be an engine operating condition or sequence of operating conditions occurring as the engine transitions to being in a completely turned-off condition (i.e., when fuel is no longer provided to fuel nozzle(s), and the shaft(s) of the engine are not rotating, or are rotating at a low speed). The wind down condition may include a ground idling condition of the engine as the engine is taxiing to its gate at the end of a flight mission (e.g., for commercial aircraft) or hanger, and/or a shutdown sequence of the engine in which it transitions from the ground idling condition to the completely turned off condition. In such a manner, it will be appreciated that providing the flow of fuel to the fuel nozzle at (302) includes at (304) providing fuel to the fuel nozzle at a first flowrate to facilitate the engine operating at the desire operating speed (e.g., idle).

The exemplary method 300 further includes at (306) operating a fuel oxygen reduction unit to reduce an oxygen content of the flow of fuel provided to the fuel nozzle of the aeronautical gas turbine engine during the wind down condition. The fuel oxygen reduction unit may be configured in a similar manner as one or more of the exemplary secondary fuel oxygen reduction units described above with reference to FIGS. 1 through 6, or alternatively may be any other suitable fuel oxygen reduction unit.

In such a manner, it will be appreciated that in at least certain exemplary aspects, operating the fuel oxygen reduction unit at (306) includes at (308) operating the fuel oxygen reduction unit substantially exclusively during the wind down condition. In the context of this step, "substantially exclusively" refers to at least 90% of a total operating time within a particular flight mission of an aircraft incorporating the fuel oxygen reduction unit.

In such a manner, it will be appreciated that the fuel oxygen reduction unit may define a maximum operating time of one hour or less per flight mission, such as 30 minutes or less per flight mission.

Additionally, or alternatively, it will be appreciated that an aircraft incorporating the aeronautical gas turbine engine may define a maximum fuel capacity (e.g., a maximum amount of fuel that may be loaded in the fuel tanks of the aircraft during typical operations). The fuel oxygen reduction unit may define a maximum volume of fuel throughput per flight mission, with the maximum volume of fuel throughput of the fuel oxygen reduction unit being less than 10 percent of the maximum fuel capacity of the aircraft.

Additionally, or alternatively, still, the fuel oxygen reduction unit may define a maximum fuel flowrate capacity. The maximum fuel flowrate capacity of the fuel oxygen reduction unit may refer to a maximum flowrate that the fuel oxygen reduction unit may effectively process (i.e., may process at an oxygen reduction level of at least 50% of its maximum oxygen reduction level). Further, as noted above, the method 300 includes operating the aeronautical gas turbine engine during a cruise condition. Operating the aeronautical gas turbine engine during the cruise condition may include providing a fuel flow to a combustion section of the aeronautical gas turbine engine at a cruise condition flowrate. The maximum fuel flowrate capacity of the fuel oxygen reduction unit is less than the cruise condition flowrate. In such a manner, it will be appreciated that the fuel oxygen reduction unit is not a steady state fuel oxygen reduction unit, and instead is a special purpose fuel oxygen reduction unit.

In such a manner, it will be appreciated that in other exemplary aspects, the fuel oxygen reduction unit is configured to operate substantially continuously. In such a configuration, the fuel oxygen reduction unit may still define the maximum fuel flowrate capacity. The maximum fuel flowrate capacity may still be less than the cruise condition flowrate, and the fuel provided to the gas turbine engine may simply not be effectively conditioned. Notably, however, it will be appreciated that depending on the operating temperatures of the gas turbine engine, the fuel flowrate, the resonance time of the fuel within a combustion section of the gas turbine engine, etc., the fuel may not need to be effectively conditioned by the fuel oxygen reduction unit during, e.g., cruise operations. The fuel oxygen reduction unit may still effectively treat substantially all of the fuel flow to the gas turbine engine during a wind down condition.

Referring still to the exemplary aspect of FIG. 7, the method 300 further includes at (310) ceasing providing the flow of fuel to the fuel nozzle of the aeronautical gas turbine engine, the fuel nozzle comprising a volume of fuel after ceasing providing the flow of fuel to the fuel nozzle. In such a manner, it will be appreciated that in the exemplary aspect shown, ceasing providing the flow of fuel to the fuel nozzle of the aeronautical gas turbine engine at (310) includes at (312) maintaining the volume of fuel in the fuel nozzle after the wind down condition. Notably, the volume of fuel remaining in the fuel nozzle may be at least about 10 milliliters, and ceasing providing the flow of fuel to the fuel nozzle of the aeronautical gas turbine engine at (310) may immediately follow the wind down condition of the engine.

The exemplary method 300 may facilitate preventing a fuel within the fuel nozzles from coking or otherwise deteriorating beyond a threshold amount after the wind down condition of the engine, despite a potentially relatively high temperature that may be reached by the fuel as a result of heat soak-back. For example, in the exemplary aspect depicted, it will be appreciated that operating the fuel oxygen reduction unit at (306) includes at (314) operating the fuel oxygen reduction unit to reduce an oxygen content of the volume of fuel in the fuel nozzle to less than 20 parts per million, and more specifically includes at (316) operating the fuel oxygen reduction unit to reduce the oxygen content of the volume of fuel in the fuel nozzle to less than 15 parts per million.

Notably, the method 300 further includes at (315) operating the aeronautical gas turbine engine during an idle condition. The gas turbine engine defines a turbine inlet temperature greater than 1000 degrees Fahrenheit while the aeronautical gas turbine engine is operating during the idle condition at (315). Further, it will be appreciated that from the discussions above with respect to FIGS. 1 through 6, the core of the engine may define a relatively high thermal mass. In such a manner, it will be appreciated that the combination of the relatively high turbine inlet temperatures during idle and the relatively high thermal mass, the soak-back may be relatively significant, such that the reduction in oxygen content of the volume of fuel remaining in the fuel nozzle is necessary to reduce a risk of the fuel coking beyond a certain threshold.

Such may allow the volume of fuel remaining in the fuel nozzles to withstand the relatively high temperatures without coking beyond a threshold level.

It will further be appreciated that in certain exemplary aspects, an oxygen level of a fuel flow to the fuel nozzle may be monitored and/or reduced during other operating conditions of the engine. For example, referring now to FIG. 8, a flow diagram of a method 300 for operating a fuel system for an aeronautical gas turbine engine in accordance with another exemplary aspect of the present disclosure is provided. The method 300 may be utilized with one or more of the exemplary fuel systems, gas turbine engines, etc. described above, or alternatively may be utilized with any other suitable fuel system.

Figure 8:
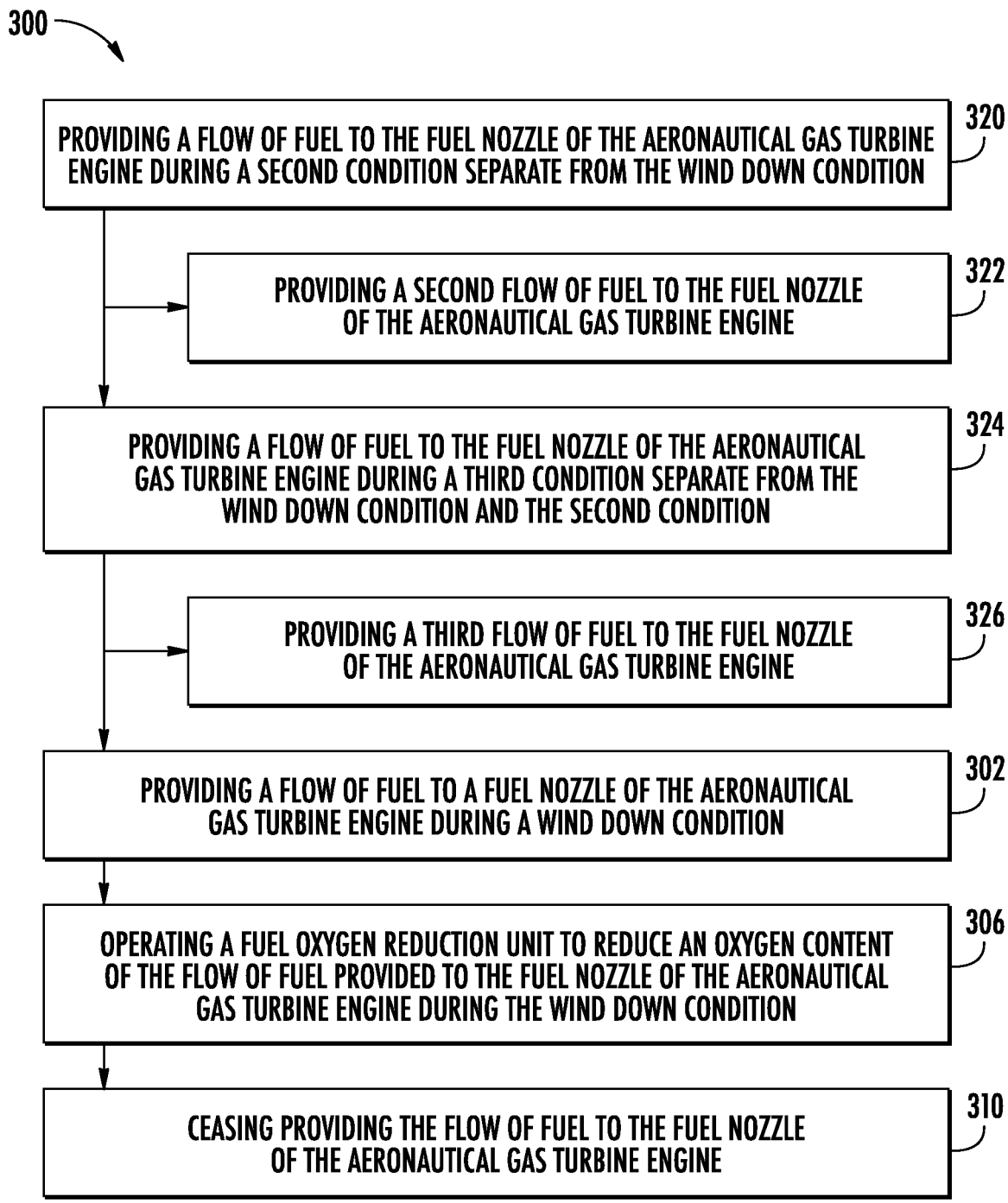
FIG. 8 is a flow diagram of a method of operating a fuel system for an aeronautical gas turbine engine in accordance with another aspect of the present disclosure.

The method 300 of FIG. 8 is similar to the method 300 of FIG. 7. For example, the method 300 of FIG. 8 generally includes at (302) providing a flow of fuel to a fuel nozzle of the aeronautical gas turbine engine during a wind down condition; at (306) operating a fuel oxygen reduction unit to reduce an oxygen content of the flow of fuel provided to the fuel nozzle of the aeronautical gas turbine engine during the wind down condition; and at (310) ceasing providing the flow of fuel to the fuel nozzle of the aeronautical gas turbine engine.

However, for the exemplary aspect of FIG. 8, an oxygen level of a fuel flow to the fuel nozzle may be further monitored and/or reduced during other operating conditions of the engine.

For example, for the exemplary aspect of FIG. 8, the method 300 includes at (320) providing a flow of fuel to the fuel nozzle of the aeronautical gas turbine engine during a second condition separate from the wind down condition. For the exemplary aspect depicted, an oxygen content of the flow of fuel to the fuel nozzle of the aeronautical gas turbine engine during the second condition is greater than the oxygen content of the volume of fuel in the fuel nozzle after ceasing providing the flow of fuel to the fuel nozzle. For example, in certain exemplary aspects, the oxygen content of the flow of fuel to the fuel nozzle of the aeronautical gas turbine engine during the flight condition is at least 1.5 times greater than the oxygen content of the volume of fuel in the fuel nozzle after ceasing providing the flow of fuel to the fuel nozzle.

More specifically, for the embodiment shown, providing the flow of fuel to the fuel nozzle during the second condition at (320) includes at (322) providing a second flow of fuel to the fuel nozzle of the aeronautical gas turbine engine. An oxygen content of the volume of fuel in the fuel nozzle after ceasing providing the flow of fuel to the fuel nozzle at (310) is a first value, and the oxygen content of the second flow of fuel provided to the fuel nozzle during the second condition at (322) is a second value. The second value is equal to at least 1.5 times the first value. More specifically, in at least certain exemplary aspects the second value is equal to at least three times the first value, such as at least five times the first value, such as up to 100 times the first value.

In certain exemplary aspects, the second condition is a flight condition of the engine. For example, in certain exemplary aspects, the second condition is a takeoff flight condition, a climb flight condition, or both.

Referring still to the exemplary aspect of FIG. 8, the method further includes at (324) providing a flow of fuel to the fuel nozzle of the aeronautical gas turbine engine during a third condition separate from the wind down condition and the second condition. Providing the flow of fuel to the fuel nozzle during the third condition at (324) includes at (326) providing a third flow of fuel to the fuel nozzle of the aeronautical gas turbine engine during the third. Similar to the exemplary aspects above, the oxygen content of the third flow of fuel provided to the fuel nozzle during the third condition is a third value. The third value is less than the second value and greater than the first value. With such an exemplary aspect, it will be appreciated that the second condition is a relatively high power flight condition, and the third condition is a relatively low power flight condition. For example, the second condition may be a takeoff flight condition, a climb flight condition, or both, and the third condition may be a cruise flight condition.

In certain exemplary aspects, a primary fuel oxygen reduction unit may be operated during the second and third conditions (and optionally during the first condition) (see FIG. 1).

In such a manner, it will be appreciated that a fuel flow to the fuel nozzles is higher during the second and third conditions, than during the wind down condition. In such a manner the fuel is not exposed to the high temperatures for as long, and the volume of fuel thorough the fuel nozzle is greater, such that there is less risk of fuel coking within the nozzle.

Further aspects of the invention are provided by the subject matter of the following clauses:

A method of operating a fuel system for an aeronautical gas turbine engine, the method comprising: providing a flow of fuel to a fuel nozzle of the aeronautical gas turbine engine during a wind down condition; operating a fuel oxygen reduction unit to reduce an oxygen content of the flow of fuel provided to the fuel nozzle of the aeronautical gas turbine engine during the wind down condition; and ceasing providing the flow of fuel to the fuel nozzle of the aeronautical gas turbine engine, the fuel nozzle comprising a volume of fuel after ceasing providing the flow of fuel to the fuel nozzle; wherein operating the fuel oxygen reduction unit comprises operating the fuel oxygen reduction unit to reduce an oxygen content of the volume of fuel in the fuel nozzle to less than 20 parts per million.

The method of one or more of these clauses, wherein operating the fuel oxygen reduction unit comprises operating the fuel oxygen reduction unit to reduce the oxygen content of the volume of fuel in the fuel nozzle to less than 15 parts per million.

The method of one or more of these clauses, further comprising: operating the aeronautical gas turbine engine during an idle condition, wherein the gas turbine engine defines a turbine inlet temperature greater than 1000 degrees Fahrenheit while the aeronautical gas turbine engine is operating during the idle condition.

The method of one or more of these clauses, wherein operating the fuel oxygen reduction unit comprises operating the fuel oxygen reduction unit substantially exclusively during the wind down condition.

The method of one or more of these clauses, wherein the fuel oxygen reduction unit defines a maximum operating time of one hour or less per flight mission.

The method of one or more of these clauses, wherein the aeronautical gas turbine engine is incorporated into an aircraft, wherein the aircraft defines a maximum fuel capacity, wherein the fuel oxygen reduction unit defines a maximum volume of fuel throughput per flight mission, and wherein the maximum volume of fuel throughput is less than 10 percent of the maximum fuel capacity of the aircraft.

The method of one or more of these clauses, further comprising: operating the aeronautical gas turbine engine during a cruise condition, wherein operating the aeronautical gas turbine engine during the cruise condition comprises providing a fuel flow to a combustion section of the aeronautical gas turbine engine at a cruise condition flowrate, wherein the fuel oxygen reduction unit defines a maximum fuel flowrate capacity, and wherein the maximum fuel flowrate capacity of the fuel oxygen reduction unit is less than the cruise condition flowrate.

The method of one or more of these clauses, further comprising: providing a flow of fuel to the fuel nozzle of the aeronautical gas turbine engine during a second condition separate from the wind down condition, wherein an oxygen content of the flow of fuel to the fuel nozzle of the aeronautical gas turbine engine during the second condition is greater than the oxygen content of the volume of fuel in the fuel nozzle after ceasing providing the flow of fuel to the fuel nozzle.

The method of one or more of these clauses, wherein the oxygen content of the flow of fuel to the fuel nozzle of the aeronautical gas turbine engine during the flight condition is at least 1.5 times greater than the oxygen content of the volume of fuel in the fuel nozzle after ceasing providing the flow of fuel to the fuel nozzle.

The method of one or more of these clauses, further comprising: providing a second flow of fuel to the fuel nozzle of the aeronautical gas turbine engine during a second condition separate from the wind down condition, wherein an oxygen content of the volume of fuel in the fuel nozzle after ceasing providing the flow of fuel to the fuel nozzle is a first value, wherein the oxygen content of the second flow of fuel provided to the fuel nozzle during the second condition is a second value, and wherein the second value is equal to at least 1.5 times the first value.

The method of one or more of these clauses, wherein the second value is equal to at least 3 times the first value.

The method of one or more of these clauses, wherein the second condition is a flight condition.

The method of one or more of these clauses, wherein the second condition is a takeoff flight condition, a climb flight condition, or both.

The method of one or more of these clauses, further comprising: providing a third flow of fuel to the fuel nozzle of the aeronautical gas turbine engine during a third condition separate from the wind down condition, wherein the oxygen content of the third flow of fuel provided to the fuel nozzle during the third condition is a third value, wherein the third value is less than the first value, wherein the second condition is a relatively high power flight condition, and wherein the third condition is a relatively low power flight condition.

The method of one or more of these clauses, wherein the volume of fuel in the fuel nozzle is at least 10 milliliters of fuel.

The method of one or more of these clauses, wherein ceasing providing the flow of fuel to the fuel nozzle of the aeronautical gas turbine engine comprises maintaining the volume of fuel in the fuel nozzle during and after the wind down condition.

An aircraft system comprising: an aeronautical gas turbine engine having a combustion section with a fuel nozzle; and a fuel system comprising a fuel source, a fuel delivery assembly, and a fuel oxygen reduction unit, wherein the fuel delivery assembly is configured to provide a flow of fuel to the fuel nozzle, and wherein the fuel oxygen reduction unit is in communication with the fuel source, the fuel delivery assembly, or both; and a controller operable with the gas turbine engine, the fuel system, or both configured to provide a flow of fuel from the fuel system to the fuel nozzle of the aeronautical gas turbine engine during a wind down condition; operate the fuel oxygen reduction unit to reduce an oxygen content of the flow of fuel provided to the fuel nozzle of the aeronautical gas turbine engine during the wind down condition; and cease providing the flow of fuel to the fuel nozzle of the aeronautical gas turbine engine, the fuel nozzle comprising a volume of fuel after ceasing providing the flow of fuel to the fuel nozzle; wherein in operating the fuel oxygen reduction unit the controller is configured to operate the fuel oxygen reduction unit to reduce an oxygen content of the volume of fuel in the fuel nozzle to less than 20 parts per million.

The aircraft system of one or more of these clauses, wherein operating the fuel oxygen reduction unit comprises operating the fuel oxygen reduction unit to reduce the oxygen content of the volume of fuel in the fuel nozzle to less than 15 parts per million.

What is claimed is:

1. A method of operating a fuel system for an aeronautical gas turbine engine, the method comprising:
    operating the aeronautical gas turbine engine during a cruise condition, wherein operating the aeronautical gas turbine engine during the cruise condition comprises providing a fuel flow to a combustion section of the aeronautical gas turbine engine at a cruise condition flowrate;
    providing a flow of fuel to a fuel nozzle of the aeronautical gas turbine engine during a wind down condition;
    operating a fuel oxygen reduction unit to reduce an oxygen content of the flow of fuel provided to the fuel nozzle of the aeronautical gas turbine engine during the wind down condition; and
    ceasing providing the flow of fuel to the fuel nozzle of the aeronautical gas turbine engine, the fuel nozzle comprising a volume of fuel after ceasing providing the flow of fuel to the fuel nozzle;
    wherein operating the fuel oxygen reduction unit comprises operating the fuel oxygen reduction unit to reduce an oxygen content of the volume of fuel in the fuel nozzle to less than 20 parts per million;
    wherein the fuel oxygen reduction unit defines a maximum fuel flowrate capacity of the fuel oxygen reduction unit, and wherein the maximum fuel flowrate capacity of the fuel oxygen reduction unit is less than the cruise condition flowrate.

2. The method of claim 1, wherein operating the fuel oxygen reduction unit comprises operating the fuel oxygen reduction unit to reduce the oxygen content of the volume of fuel in the fuel nozzle to less than 15 parts per million.

3. The method of claim 1, further comprising:
    operating the aeronautical gas turbine engine during an idle condition, wherein the gas turbine engine defines a turbine inlet temperature greater than 1000 degrees Fahrenheit while the aeronautical gas turbine engine is operating during the idle condition.

4. The method of claim 1, wherein the volume of fuel in the fuel nozzle is at least 10 milliliters of fuel.

5. The method of claim 1, wherein operating the fuel oxygen reduction unit comprises operating the fuel oxygen reduction unit substantially exclusively during the wind down condition.

6. The method of claim 1, wherein the fuel oxygen reduction unit defines a maximum operating time of one hour or less per flight mission.

7. The method of claim 1, wherein the aeronautical gas turbine engine is incorporated into an aircraft, wherein the aircraft defines a maximum fuel capacity, wherein the fuel oxygen reduction unit defines a maximum volume of fuel throughput per flight mission, and wherein the maximum volume of fuel throughput is less than 10 percent of the maximum fuel capacity of the aircraft, wherein the maximum volume of fuel throughput per flight mission of the fuel oxygen reduction unit is a maximum amount of fuel the fuel oxygen reduction unit treats at a level within about 50 percent of its maximum efficiency.

8. The method of claim 1, further comprising:
    providing a flow of fuel to the fuel nozzle of the aeronautical gas turbine engine during a second condition separate from the wind down condition, wherein an oxygen content of the flow of fuel to the fuel nozzle of the aeronautical gas turbine engine during the second condition is greater than the oxygen content of the volume of fuel in the fuel nozzle after ceasing providing the flow of fuel to the fuel nozzle.

9. The method of claim 8, wherein the oxygen content of the flow of fuel to the fuel nozzle of the aeronautical gas turbine engine during the second condition is at least 1.5 times greater than the oxygen content of the volume of fuel in the fuel nozzle after ceasing providing the flow of fuel to the fuel nozzle.

10. The method of claim 1, further comprising:
providing a second flow of fuel to the fuel nozzle of the aeronautical gas turbine engine during a second condition separate from the wind down condition, wherein an oxygen content of the volume of fuel in the fuel nozzle after ceasing providing the flow of fuel to the fuel nozzle is a first value, wherein the oxygen content of the second flow of fuel provided to the fuel nozzle during the second condition is a second value, and wherein the second value is equal to at least 1.5 times the first value.

11. The method of claim 10, wherein the second value is equal to at least 3 times the first value.

12. The method of claim 10, wherein the second condition is a flight condition.

13. The method of claim 10, wherein the second condition is a takeoff flight condition, a climb flight condition, or both.

14. The method of claim 10, further comprising:
providing a third flow of fuel to the fuel nozzle of the aeronautical gas turbine engine during a third condition separate from the wind down condition, wherein the oxygen content of the third flow of fuel provided to the fuel nozzle during the third condition is a third value, wherein the third value is less than the first value, wherein the second condition is a relatively high power flight condition, and wherein the third condition is a relatively low power flight condition.

15. The method of claim 1, wherein ceasing providing the flow of fuel to the fuel nozzle of the aeronautical gas turbine engine comprises maintaining the volume of fuel in the fuel nozzle during and after the wind down condition.

16. An aircraft system comprising:
an aeronautical gas turbine engine having a combustion section with a fuel nozzle; and
a fuel system comprising a fuel source, a fuel delivery assembly, and a fuel oxygen reduction unit, wherein the fuel delivery assembly is configured to provide a flow of fuel to the fuel nozzle, and wherein the fuel oxygen reduction unit is in communication with the fuel source, the fuel delivery assembly, or both; and
a controller operable with the gas turbine engine, the fuel system, or both, wherein the controller is configured to:
provide a flow of fuel from the fuel system to the fuel nozzle of the aeronautical gas turbine engine during a wind down condition;
provide a flow of fuel from the fuel system to a combustion section of the aeronautical gas turbine engine at a cruise condition flowrate during a cruise condition;
operate the fuel oxygen reduction unit to reduce an oxygen content of the flow of fuel provided to the fuel nozzle of the aeronautical gas turbine engine during the wind down condition; and
cease providing the flow of fuel to the fuel nozzle of the aeronautical gas turbine engine, the fuel nozzle comprising a volume of fuel after ceasing providing the flow of fuel to the fuel nozzle;
wherein in operating the fuel oxygen reduction unit the controller is configured to operate the fuel oxygen reduction unit to reduce an oxygen content of the volume of fuel in the fuel nozzle to less than 20 parts per million;
wherein the fuel oxygen reduction unit defines a maximum fuel flowrate capacity of the fuel oxygen reduction unit, and wherein the maximum fuel flowrate capacity of the fuel oxygen reduction unit is less than the cruise condition flowrate.

17. The aircraft system of claim 16, wherein operating the fuel oxygen reduction unit comprises operating the fuel oxygen reduction unit to reduce the oxygen content of the volume of fuel in the fuel nozzle to less than 15 parts per million.

18. The aircraft system of claim 16, wherein the volume of fuel in the fuel nozzle is at least 10 milliliters of fuel.

19. A method of operating a fuel system for an aeronautical gas turbine engine, the method comprising:
providing a flow of fuel to a fuel nozzle of the aeronautical gas turbine engine during a wind down condition;
operating a fuel oxygen reduction unit to reduce an oxygen content of the flow of fuel provided to the fuel nozzle of the aeronautical gas turbine engine during the wind down condition; and
ceasing providing the flow of fuel to the fuel nozzle of the aeronautical gas turbine engine, the fuel nozzle comprising a volume of fuel after ceasing providing the flow of fuel to the fuel nozzle;
providing a second flow of fuel to the fuel nozzle of the aeronautical gas turbine engine during a second condition separate from the wind down condition, wherein the second condition is a relatively high power flight condition, wherein an oxygen content of the volume of fuel in the fuel nozzle after ceasing providing the flow of fuel to the fuel nozzle is a first value, wherein the oxygen content of the second flow of fuel provided to the fuel nozzle during the second condition is a second value, and wherein the second value is equal to at least 1.5 times the first value; and
providing a third flow of fuel to the fuel nozzle of the aeronautical gas turbine engine during a third condition separate from the wind down condition, wherein the third condition is a relatively low power flight condition, wherein the oxygen content of the third flow of fuel provided to the fuel nozzle during the third condition is a third value, wherein the third value is less than the first value;
wherein operating the fuel oxygen reduction unit comprises operating the fuel oxygen reduction unit to reduce an oxygen content of the volume of fuel in the fuel nozzle to less than 20 parts per million.

20. The method of claim 19, wherein operating the fuel oxygen reduction unit comprises operating the fuel oxygen reduction unit substantially exclusively during the wind down condition.

* * * * *